United States Patent [19]

Sawada et al.

[11] 3,915,094

[45] Oct. 28, 1975

[54] MULTI-DIRECTIONAL RAILWAY VEHICLE

[75] Inventors: Yuji Sawada; Katsumi Takemoto; Takashi Kawarai, all of Tokyo, Japan

[73] Assignee: Mitsubishi Jukogyo Kabushiki Kaisha, Tokyo, Japan

[22] Filed: Oct. 31, 1972

[21] Appl. No.: 302,399

[30] Foreign Application Priority Data

Nov. 11, 1971  Japan............................ 46-105337

[52] U.S. Cl. .............. 104/130; 104/166; 104/168; 104/243; 105/30; 105/144; 105/177
[51] Int. Cl.² .................... B61B 13/12; B61C 11/00; E01B 25/06; E01B 25/12
[58] Field of Search........ 104/130, 147 R, 166, 167, 104/168, 243; 105/144, 177, 30

[56] References Cited
UNITED STATES PATENTS

| 3,356,040 | 12/1967 | Fonden............................. | 104/130 |
| 3,591,241 | 7/1971 | Allen ................................. | 104/147 X |
| 3,621,790 | 11/1971 | Broome ............................. | 104/166 X |
| 3,626,859 | 12/1971 | Bradbury et al. ................. | 104/168 X |
| 3,650,216 | 3/1972 | Broome et al. ...................... | 104/166 |
| 3,727,560 | 4/1973 | Blemly et al. ....................... | 105/30 |
| 3,807,312 | 4/1974 | Flodell ............................. | 105/144 X |

Primary Examiner—M. Henson Wood, Jr.
Assistant Examiner—Howard Beltran
Attorney, Agent, or Firm—Cushman, Darby & Cushman

[57] ABSTRACT

A carrier device movable along a path having a right angle turn, comprising a truck frame, a drive wheel provided centrally of the bottom of said truck frame and rotatably mounted on a support member which is rotatably mounted on said truck frame, said drive wheel consisting of a roller or pulley having a motor disposed therein and running on a central rail, guide wheels provided on both sides of the bottom of said truck frame and being rotatable while being guided by side rails respectively, drive means provided on said truck frame for turning said support member together with said drive wheel at least 90° about a vertical shaft and truck frame locking means for holding said truck frame against rotation at the time when said drive wheel is turned about the vertical shaft.

1 Claim, 6 Drawing Figures

MULTI-DIRECTIONAL RAILWAY VEHICLE

BACKGROUND OF THE INVENTION

1. Field of the Invention

This invention relates to a carrier device movable along a path, which is adapted for use in the transportation of articles at automatized warehouses, parking facilities and other various article handling facilities.

2. Description of the Prior Art

With a view to saving the labor in article handling operations, development of an operator-less, self-running carrier device has been demanded, which travels on rails under remote control of a robot while freely changing its direction of travel, for carrying articles to their destinations. The present invention has been achieved to meet such demand.

SUMMARY OF THE INVENTION

It is the object of the present invention to provide a self-running carrier device which is simple in construction and capable of carrying articles quickly and accurately to their destinations while travelling on a central rail and side rails arranged along a path having a right angle turn.

According to the present invention there is provided a carrier device movable along a path having a right angle turn, which comprises a truck frame, a drive wheel provided centrally of the bottom of said truck frame and rotatably mounted on a support member which is rotatably mounted on said truck frame, said drive wheel consisting of a roller or pulley having a motor disposed therein and running on a central rail, guide wheels provided on both sides of the bottom of said truck frame and being rotatable while being guided by side rails respectively, drive means provided on said truck frame for turning said support member together with said drive wheel at least 90° about a vertical shaft and truck frame locking means for holding said truck frame against rotation at the time when said drive wheel is turned about the vertical shaft.

In the carrier device of the invention, as described above, the drive wheel provided at the center of the bottom of the truck frame and supported by the support member consists of a roller or pulley having a motor disposed therein. This drive wheel travels along the central rail and is rotatable 90° at a right angle intersection of the rail together with the support member when said support member is rotated by the drive means. During this direction changing operation of the drive wheel, the truck frame is held against rotation by the truck frame locking means, so that the drive wheel only is rotated positively smoothly and thus the direction of travel of the carrier device can be quickly changed.

Further, in the carrier device of the invention the guide wheels are provided on both sides of the bottom of the truck frame, which are guided by the side rails respectively, so that the movement of the carrier device is sufficiently stable. Furthermore, since the drive wheel consists of a roller or pulley having a motor disposed therein, the driving mechanism of the carrier device is substantially simplified.

DESCRIPTION OF THE PREFERRED EMBODIMENT

Figure 1:
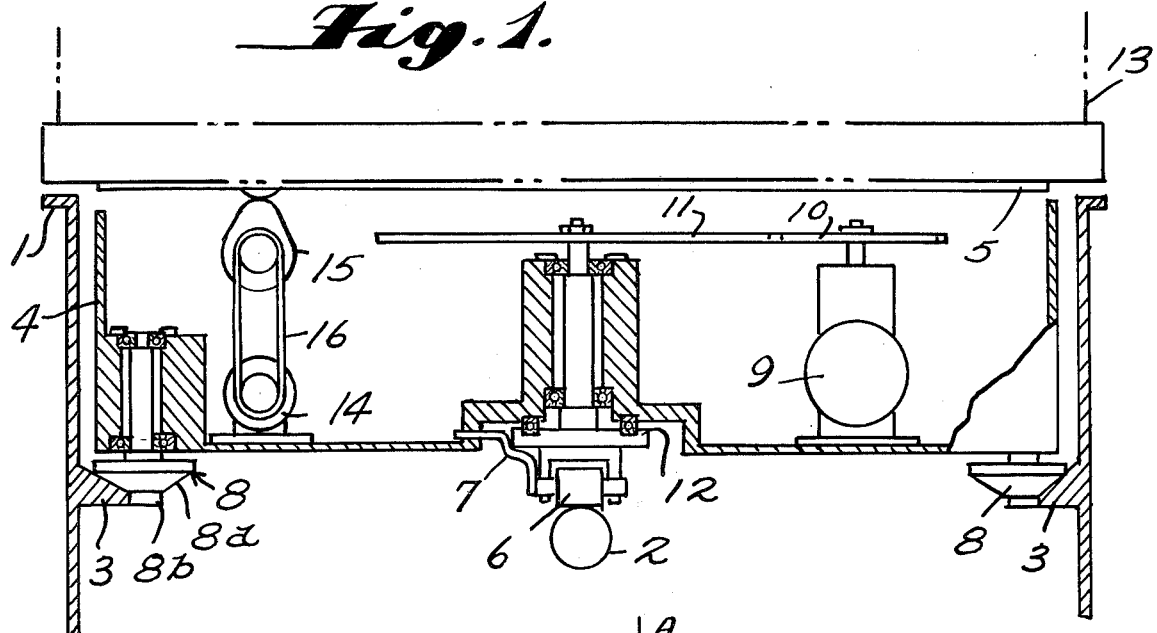
FIG. 1 is a transverse sectional view of an embodiment of the carrier device according to the invention.
Figure 2:
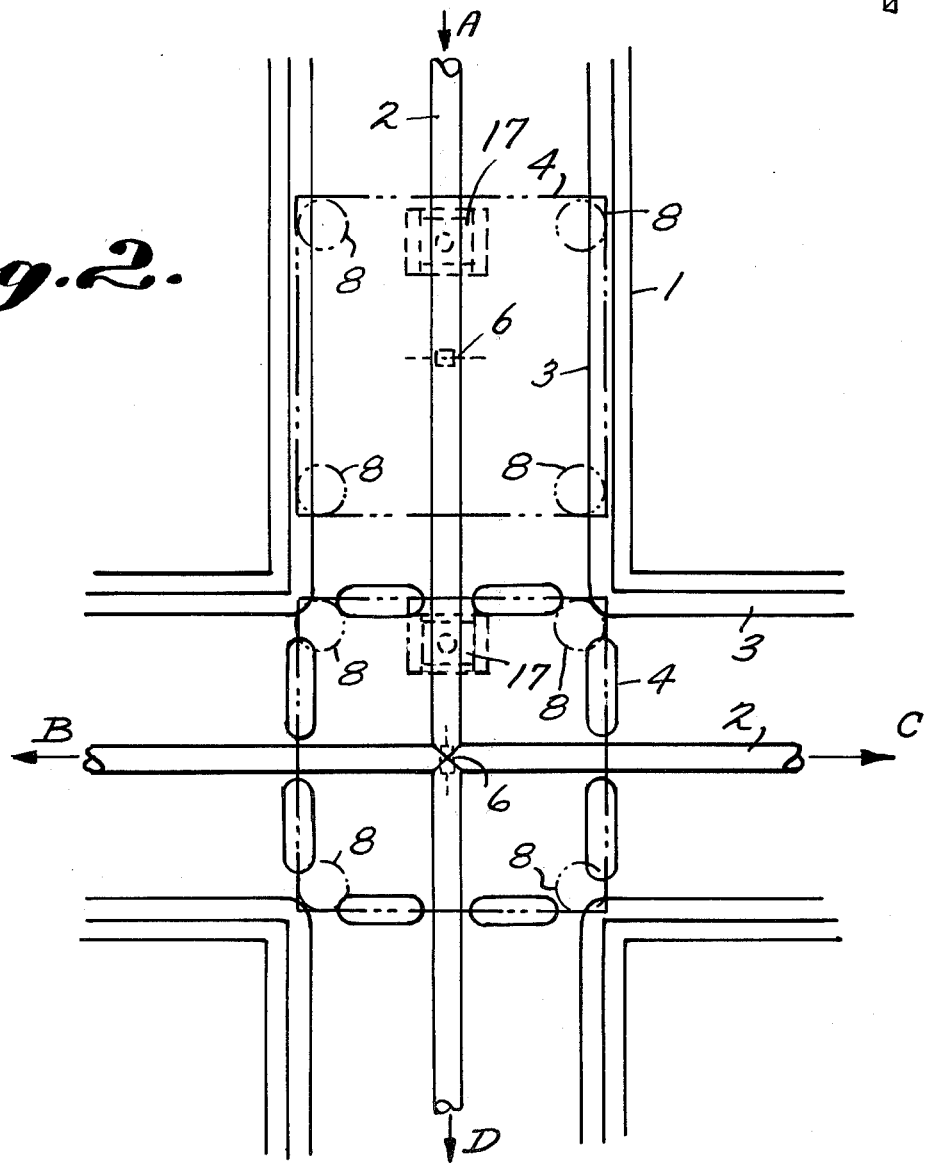
FIG. 2 is a plan view illustrating the manner in which the carrier device shown in FIG. 1 operates.

A preferred embodiment of the carrier device according to the invention will be described hereunder with reference to the drawings. FIG. 1 of the drawings is a transverse sectional view of the carrier device and FIG. 2 is a plan view showing the manner in which the carrier device operates. As shown in FIG. 2, a central rail 2 having a circular cross section is extended centrally of a space between a pair of article support structures 1 arranged in a warehouse or the like facility in parallel relation to each other, and a side rail 3 having a downwardly inclined surface is arranged extending along the inside surface of each article support structure 1. The carrier device includes a truck frame 4, a loading table 5, a motor roller 6 constituting a drive wheel and guide wheels 8, and is mounted on the rails 2, 3, with said motor roller 6 and guide wheels 8 resting on said rails 2, 3 respectively.

The truck frame 4 is square in shape as viewed from the upper side thereof and the motor roller 6 is provided at the center of the bottom of said truck frame 4. This motor roller 6 is a device, known in the art, which incorporates an electric motor portion which rotates the roller portion thereof. Electric current is supplied to the electric motor portion of the motor roller 6 through a cable 7.

Another electric motor 9 is mounted on the truck frame 4 for changing the direction of travel of the carrier device 90° at the intersections of the rails. Namely, an arrangement is made such that, when the electric motor 9 is set in motion, the drive of said motor is transmitted through gears 10, 11 to a support member 12 causing it to rotate about a vertical shaft, which in turn causes the motor roller 6 to rotate integrally therewith.

The guide wheels 8 are respectively provided at the four corners of the bottom of the truck frame 4 and are rotatable about vertical shafts. Each guide wheel 8 has a conical surface 8a and a vertical surface 8b which are guided by the inclined surface and inner vertical surface of the side rail 3 respectively.

An arrangement is made such that an article 13 being carried on the loading table 5 will be shifted onto the article support structure 1 when said loading table is moved down, and the vertical movement of said loading table 5 is effected by a cam wheel 15 which is driven from an electric motor 14 through a chain 16. The loading table 5 will be held in its elevated position while the carrier device is travelling with the article 13 thereon and in its lowered position when the article 13 is to be unloaded or while the carrier device is travelling with no article thereon.

Figure 3:
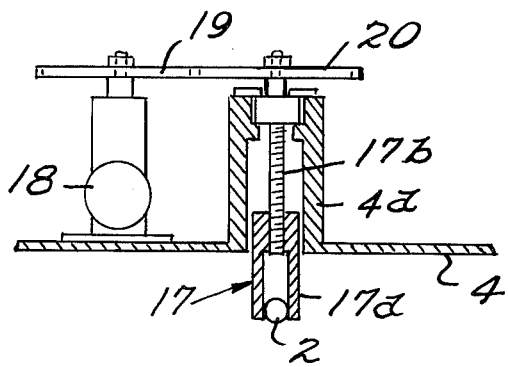
FIG. 3 is a sectional view showing the truck frame locking means being in its actuated position.

Further, as shown in FIG. 3, the truck frame 4 is provided with locking means 17 for locking the truck frame 4 at the time when the direction of travel of said carrier device is changed at the intersection of the rails.

Figure 4:
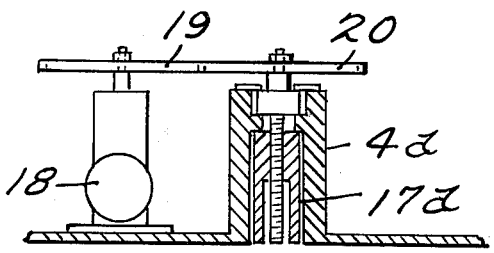
FIG. 4 is a sectional view similar to FIG. 3 but showing the truck frame locking means being in its retracted position.

FIG. 3 and 4 are sectional views showing the details of the truck frame locking means 17, of which FIG. 3 is a view of the locking means in its actuated position and FIG. 4 is a view of the same in its retracted position. As shown in these Figures, the truck frame locking means 17 comprises a fork member 17a vertically movable within a guide structure 4a on the truck frame 4 and an externally threaded rod 17b screwed into an internally threaded hole of said fork member, and is so operative that when the rod 17b is rotated from an electric motor 18 through gears 19, 20, the fork member 17a will be moved up or down within the guide structure 4a while being held against rotation.

In the lowered position, the fork member 17a holds the central rail 2 from both sides, whereby the truck frame 4 is held against rotation relative to said central rail 2.

Because of the construction described above, when the motor roller 6 is driven on the central rail 2, in the position shown in FIG. 1, the carrier device can travel with the guide wheels 8 being guided by the side rails 3 respectively.

When the carrier device travelling in the direction of the arrow A shown in FIG. 2 has reached the intersections of the central rail 2 and side rails 2, with the motor roller 6 located at the intersection of the central rail 2, suitable detector means (not shown) is actuated to stop the motor roller 6 and therefore, the carrier device, preparatory for changing the direction of travel of the carrier device to the direction of the arrow B or C.

Then, the truck frame locking means 17 is actuated and its fork member 17a is lowered to a position to hold the central rail 2 from both sides as shown in FIG. 3, and the motor roller 6 is rotated 90° about the vertical shaft by the electric motor 9. In this case, the truck frame 4 is held against rotation by the locking means 17 and the motor roller 6 only is rotated smoothly about the vertical shaft.

After the direction of the motor roller 6 has thus been changed, the fork member 17a of the locking means is retracted into the guide structure 4a as shown in FIG. 4 and then the motor roller 6 is driven again. Thus, the carrier device can travel in the direction of the arrow B or C in FIG. 2.

In the event when the carrier device travelling in the direction of the arrow A continuously travels straight forward in the direction of the arrow D, the aforesaid detector means is obviously not actuated, so that the carrier device can travel straight forward without temporarily stopping at the intersections of the rails.

Figure 5:
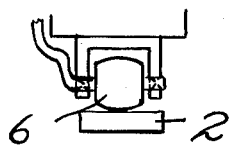
FIG. 5 is a fragmentary view showing another type of the drive wheel.

Although in the embodiment described above, the motor roller 6 is cylindrical in outer shape and the cooperating central rail 2 is circular in cross section, it is to be understood that the motor roller 6 may be in the shape of a barrel and the central rail 2 in the shape of a flat strip, as shown in FIG. 5.

Figure 6:
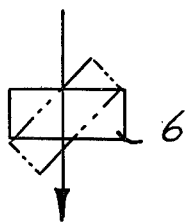
FIG. 6 is a view illustrating the manner in which the drive wheel is operated.

It is also to be understood that, by inclining the motor roller 6 relative to the direction of travel of the carrier device, as shown in FIG. 6, during travel of said carrier device, the travelling speed of the carrier device can be reduced according to the angle of inclination of said roller motor. When the motor roller 6 is rotated about the vertical shaft, during running of the carrier device at portions of the rail other than the intersection thereof, to reduce the speed of said carrier device as described above, the incident rotation of the truck frame 4 caused by the reaction can be prevented by the guide wheels 8.

It is of course possible, in the embodiment described above, to replace the motor roller 6 by a motor pulley having a motor and a reduction gearing disposed therein.

According to the carrier device of the invention described in detail herein, the truck frame is provided with a drive wheel at the center of the bottom thereof, which is rotatable at least 9090 degrees, and with guide wheels on both sides of the bottom thereof, so that the travelling direction of the carrier device can be changed very smoothly at the intersections of the rails, and this smooth direction changing operation is more ensured by the locking means which holds the truck frame against rotation during the direction changing operation. Furthermore, in the carrier device of the invention the drive wheel consists of a roller having a motor disposed therein or a pulley having a motor and a reduction gearing disposed therein, so that the space to be taken by the driving mechanism can be saved and the carrier device can be assembled easily and produced at a low cost.

1. A carrier device moveble along pathways each defined by a stationary central rail and flanking side rails, which pathways include intersections where the rails of one pathway meet those of another at an angle exemplified by a right angle, said carrier device comprising:

a truck frame;

a roller means powered to rotate about a generally horizontal axis;

support means on the truck frame for mounting the roller means below the truck frame, the support means mounting the roller means for pivotal movement about a generally vertical axis;

direction changing means on the truck frame for actuating the support means to pivot the roller means to a selected angular extent through a range of at least 90°;

guide wheel means rotatably disposed on the truck frame for rolling engagement with the side rails;

and truck frame locking means including a central rail engaging fork means and means on the truck frame for advancing the fork means into engagement with the central rail and for retracting the fork means from such engagement, so that when it is desired to pivot the roller means at an intersection of pathways, the fork means may be advanced into engagement with the central rail if it is also desired that the truck frame not pivot when the roller means pivots but maintain the same absolute spatial orientation.

* * * * *